United States Patent [19]

Tward

[11] 4,366,680

[45] Jan. 4, 1983

[54] CYCLING JOULE THOMSON REFRIGERATOR

[76] Inventor: Alan M. Lovelace, Administrator of the National Aeronautics and Space Administration, with respect to an invention of Emanuel Tward, Northridge, Calif.

[21] Appl. No.: 229,239

[22] Filed: Jan. 28, 1981

[51] Int. Cl.³ ............................................. F25B 19/00
[52] U.S. Cl. .................................... 62/514 R; 62/48; 337/14
[58] Field of Search ................. 62/48, 514 R, 514 JT, 62/480, 490; 337/114

[56] References Cited

U.S. PATENT DOCUMENTS

| | | | |
|---|---|---|---|
| 3,611,740 | 10/1971 | Giger | 62/514 R |
| 4,048,814 | 9/1977 | Quack | 62/514 R |
| 4,111,002 | 9/1978 | Van Mal et al. | 62/514 R |
| 4,161,211 | 7/1979 | Duffy et al. | 62/48 |
| 4,178,987 | 12/1979 | Bowman et al. | 62/48 |

Primary Examiner—Ronald C. Capossela
Attorney, Agent, or Firm—Monte F. Mott; John R. Manning; Thomas H. Jones

[57] ABSTRACT

A symmetrical adsorption pump/compressor system having a pair of mirror image legs and a Joule Thomson expander 40, or valve, interposed between the legs thereof for providing a new, efficient refrigeration cycle. The system further includes a plurality of gas operational heat switches 48a, 48b, 48c, and 48d adapted selectively to transfer thereto heat from a thermal load 44 and to transfer or discharge heat therefrom through a heat projector 46, such as a radiator or the like. The heat switches comprise gas pressurizable chambers adapted for alternate pressurization in response to adsorption and desorption of a pressurizing gas confined therein.

6 Claims, 3 Drawing Figures

CYCLING JOULE THOMSON REFRIGERATOR

ORIGIN OF THE INVENTION

The invention described herein was made in the performance of work under a NASA Contract and is subject to the provisions of Section 305 of the National Aeronautics & Space Act of 1958, Public Law 85-568 (72 STAT 435; 42 U.S.C. 2457).

BACKGROUND OF THE INVENTION

The invention generally relates to adsorption refrigeration systems and more particularly to a new symmetrical adsorption pump/compressor system combined with a Joule Thomson valve for providing a new, efficient refrigeration cycle.

DESCRIPTION OF THE PRIOR ART

Heretofore, long-life reliable refrigerators of relatively low mass and bulk generally have been unavailable. The lack of such refrigerators particularly has been recognized in the aerospace industry which requires reliability exceeding that of the mechanical refrigerators heretofore available in the marketplace. The lack of sufficient reliability results, at least in part, from the fact that mechanical refrigerators tend to fail because of an inherent degradation of moving parts and associated seals occuring during missions of long durations. Additionally, it generally is accepted that mechanical refrigerators tend to be of excessive bulk and mass and thus generally are found to be undesirable in many phases of the aerospace industry. Adsorption refrigerators, of course, are notoriously old.

In view of the foregoing, it should now be apparent that there currently exists a need for a serviceable and dependable system having high heat dissipating capabilities and yet adaptable for miniaturization for use in systems of types often encountered in the aerospace industry.

It is therefore the general purpose of the instant invention to provide an improved refrigeration system comprising a new symmetrical adsorption pump/compressor combined with a Joule Thomson valve through a use of which a refrigeration cycle of enhanced reliability is realized.

OBJECTS AND SUMMARY OF THE INVENTION

It is an object of the invention to provide an improved refrigeration system characterized by increased reliability and with attendant reduction in mass and bulk.

It is another object to provide in an adsorption refrigeration system wherein a gas reversely is caused to flow through the system for thus enhancing the cooling capabilities thereof.

It is another object to provide a symmetrical adsorption refrigeration system with a Joule Thomson valve to provide a new refrigeration cycle characterized by an enhanced efficiency.

It is another object to provide an improved adsorption system the operation of which is controlled through a plurality of heat switches, such as gas heat switches.

Another object is to provide an improved adsorption refrigeration system which is particularly useful in the aerospace industry, although not necessarily restricted in use thereto since the refrigeration system may be employed in a terrestial environment wherein a high degree of efficiency is required, without attendant weight and bulk penalties being imposed.

It is another object to provide an improved gas heat switch having a capability for accommodating selective switching operations.

These together with other objects and advantages are achieved through a combination of a Joule Thomson valve with a symmetrical adsorption pump-compressor and a plurality of gas heat switches adapted selectively to apply heat from a thermal load and to discharge heat through a heat rejector, such as a radiator or the like, as will become more readily apparent by reference to the following description and claims in light of the accompanying drawings.

DESCRIPTION OF THE PREFERRED EMBODIMENT

Figure 1:
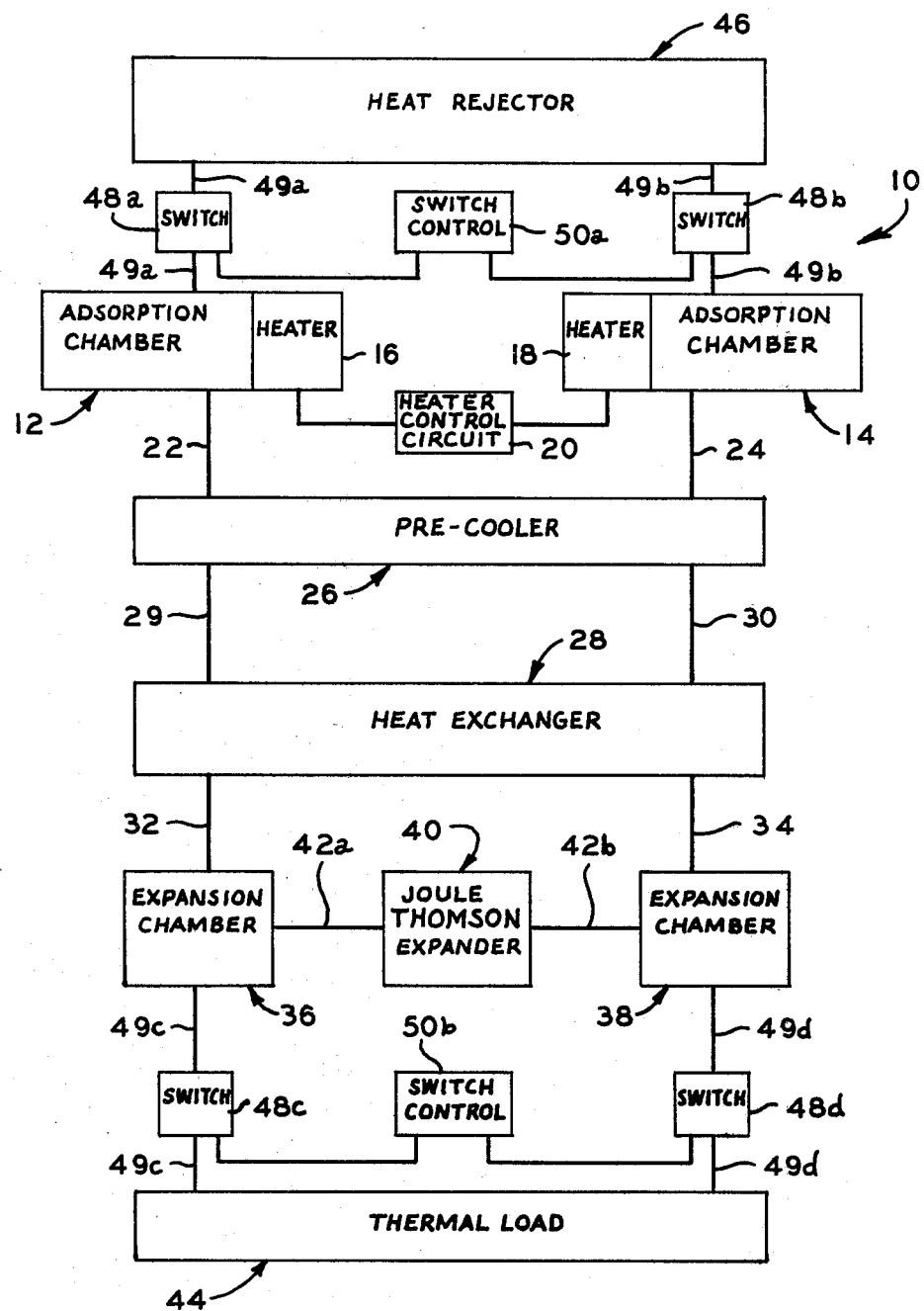
FIG. 1 is a schematic view of a system embodying the principles of the instant invention.

Referring now to the drawings with more particularity, wherein like reference characters designate like or corresponding parts throughout the several views, there is shown in FIG. 1 a system characterized by a symmetrical adsorption pump/compressor system, hereinafter referred to as an adsorption refrigeration system, generally designated 10, embodying the principles of the instant invention.

As hereinbefore mentioned, adsorption refrigeration systems are notoriously old. Further, the specific structure required and the modes of operations employed in successful operation of various system components as found in a conventional adsorption refrigeration system, generally are believed to be well known. Therefore, since the details of the conventional components form no part of the claimed invention, a detailed description of each of the components depicted in the drawings is neither deemed necessary nor desirable.

It suffices to understand that the system 10 includes a first adsorption chamber generally designated 12 and a second adsorption chamber, generally designated 14. In practice, each of the adsorption chambers is of known design and includes therein a suitable adsorbant, not shown. Suitable adsorbants, however, include Zeolite, charcoal, and metal hydrides utilized in a manner fully understood by those familiar with adsorption refrigerators.

It is to be understood that the system 10 is charged with a body of gas. Such a gas is characterized by a relatively high cooling capacity when expanded and is compatible with the particular adsorbant employed. One gas found suitable for use with the aforementioned adsorbants is helium. However, other gases may be employed equally as well, all without departing from the scope and spirit of the instant invention.

As shown, a pair of heater units, designated 16 and 18, are provided for selectively heating the adsorption chambers 12 and 14, respectively. For purposes of providing for a complete understanding of the instant invention, it may be assumed that the heaters 16 and 18 comprise resistance heaters.

Also, for the sake of providing for a complete understanding of the instant invention, there is depicted a heater control circuit 20 connected with each of the heaters 16 and 18 for purposes of controlling the operations thereof. However, it is important to note that heaters of other types can be employed equally as well. For example, depending upon prevailing temperatures and heat transfer capability required in a given environment for the system, the heaters 16 and 18 may constitute no more than thermal bridges coupled to sources of heat found to exist in the environment in which the system 10 is employed.

The system 10 also includes fluid conduits 22 and 24. These conduits are connected at the output side of the adsorption chambers 12 and 14 and serve to commonly connect thereto a pre-cooler, generally designated 26. The pre-cooler 26 is of any suitable design. Where so desired, the pre-cooler 26 may comprise a simple heat exchanger, such as a radiator or a refrigerator, driven by a suitable auxiliary system, not shown. Additionally, like the heaters 16 and 18, the pre-cooler 26 may constitute no more than a thermal bridge having a capability for delivering to the system's environment, heat extracted from the gas as it is caused to flow therethrough.

At the output side of the pre-cooler 26, there is provided a heat exchanger 28, also of known design. The design and function of the heat exchanger 28 is similar to the design and function of such devices found in conventional adsorption refrigeration systems.

Briefly, the heat exchanger 28 is coupled at the output side of the pre-cooler 26, through conduits 29 and 30, which permit gases flowing through the heat exchanger 28 to flow in cyclically reversing directions, as will hereinafter become more readily understood. The purpose for accommodating gas flow through the heat exchanger is to transfer heat from the gas for further cooling the gas as it is caused alternately to exit the adsorption chambers 12 and 14.

Connected to the output side of the heat exchanger 28, via conduits 32 and 34, there is a pair of expansion chambers, generally designated 36 and 38. The expansion chambers 36 and 38 also are of a design well known by those familiar with adsorption refrigeration systems. Therefore, a detailed description of these system components also is omitted in the interest of brevity. However, it is to be understood that while the expansion chambers 36 and 38, as herein employed, may be considered to comprise "free" expansion chambers, where so desired, conventional Joule Thomson valves may be employed for accommodating an expansion of the gas as it alternately is expelled into the expansion chambers 36 and 38.

Finally, interposed between the expansion chambers 36 and 38 there is a Joule Thomson expander, generally designated 40. The Joule Thomson expander, as employed, also is of conventional design and is characterized by a capability of accommodating a rapid expansion of gases, such as the capability which characterizes a conventional Joule Thomson valve. As shown, the Joule Thomson expander 40 is interposed between and connected with both of the expansion chambers 36 and 38 through conduits, designated 42a and 42b. As also will hereinafter be more readily apparent, a selected gas is cyclically caused to flow reversely through the expander 40 for purposes of further cooling the gas, prior to its alternate delivery, to a "downstream" expansion chamber, 36 or 38, as is dictated by the direction in which the gas is caused to flow through the expander 40.

At this juncture, it is important to note that the system 10 is interposed between a thermal load, designated 44, and a heat rejector, generally designated 46. The thermal load, of course, is, in operation, cooled by the system 10, while the heat rejector 46 simply serves as a heat discharge component for the elimination of thermal energy. In practice, the thermal load 44 may comprise any type of load found aboard a vehicle, such as electronic equipment found aboard space craft, while the heat rejector 46 comprises no more than a plate exposed to ambient temperatures.

It is at this juncture, important to note that both the thermal load 44 and the heat rejector 46 are connected to the system 10 via selectively operable gas heat switches, designated 48a, 48b, 48c and 48d, interposed in thermal conductors 49a, 49b, 49c, and 49d. Each of the heat switches 48a through 48d, in turn, are controlled through switch control circuits or components, designated 50a and 50b.

Figure 2:
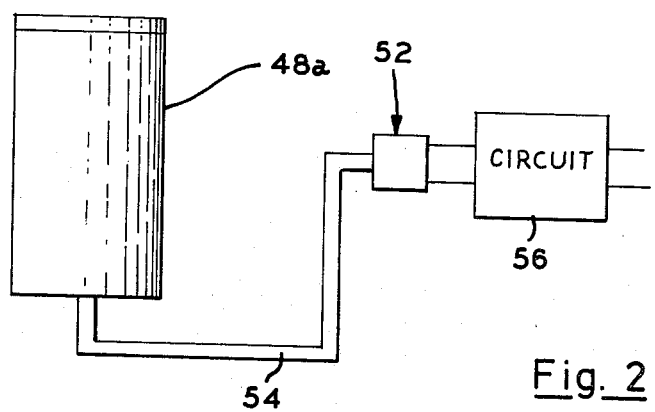
FIG. 2 is a schematic view depicting a heat switch coupled with a control circuit, as is employed in the system shown in FIG. 1.

Since the heat switches 48a through 48d are of a similar design, a detailed description of a single one of the switches is deemed adequate for a complete understanding of the instant invention. Therefore, with reference to FIG. 2, it can be seen that the switch 48a comprises a substantially hermetically sealed unit connected with a further adsorption chamber 52 through a suitable conduit 54. The operation of adsorption chamber 52 is, in turn, controlled through an electrical control circuit 56. This circuit is of any suitable design, but as shown, FIG. 3, control of this circuit is obtained through conventional circuitry, designated 50a. Since the control circuit 56, as well as the control circuit 50a therefor, forms no part of the invention herein claimed, a more detailed description thereof is omitted in the interest of brevity.

Figure 3:
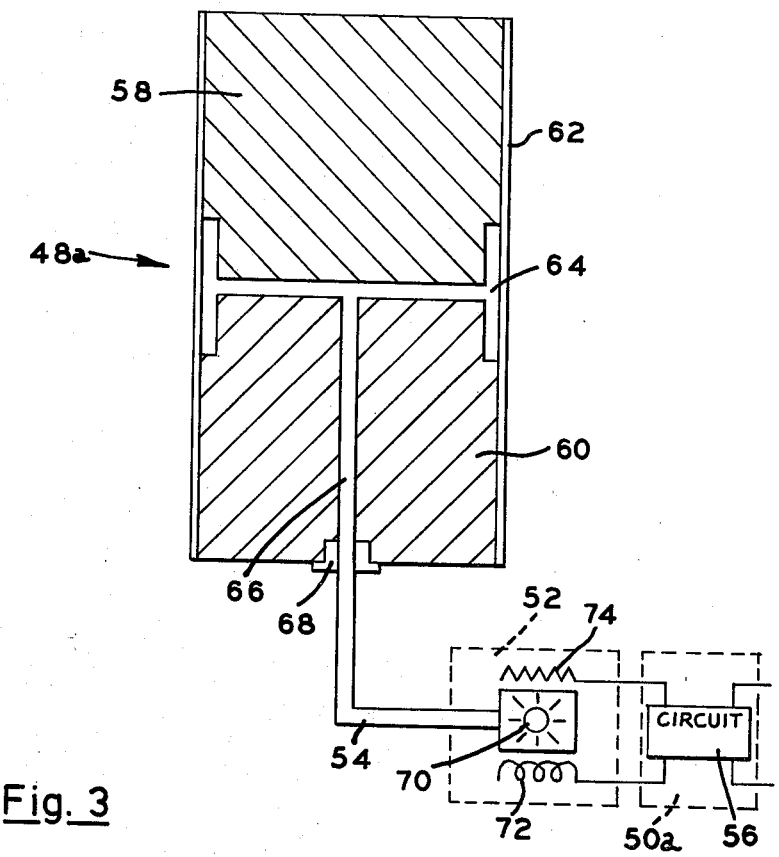
FIG. 3 is a vertically sectioned, partially schematic view depicting the heat switch shown in FIG. 2.

Referring now to FIG. 3, however, it can be seen that the heat switch 48a includes a first thermal conductive member 58 and a second thermal conductive member 60. The members 58 and 60 are mutually spaced and are fabricated from any one of a myriad of metals, or similar materials, comprising good thermal conductors. The wall of the switch, designated 62, is fabricated from a material comprising a relatively poor thermal conductor, or thermal insulating material. A suitable material, such as thin glass, has been used with acceptable success. As shown, the wall 62 is of a cylindrical configuration while the members 58 and 60 conform to cylindrical plugs received in the opposite ends of the wall 62. Defined between the members 58 and 60 there is a pressure chamber 64. In practice, the thickness of the walls 62 and the axial dimension of the chamber 64 are minimized for thereby enhancing the system's efficiency.

As is well known, a chamber charged with a pressurized thermal conductive gas, such as helium, has a capability of conducting a thermal current from a first body to a relatively cooler second body. Accordingly, it is to be understood that an interruptable thermal path may be established between the members 58 and 60 simply by causing the chamber 64 to undergo pressurization, for thereby establishing a current path between the members 58 and 60, and subsequently to undergo evacuation for purposes of interrupting the thus established thermal path between the members. Thus a "switching" function is achieved.

As is also well-known, it is possible to cool an adsorbant for thus causing the adsorbant to adsorb a quantity of gas and later give up the gas in the presence of heat.

Hence, in order to achieve the desired pressurization and subsequent evacuation of the pressure chamber 64, the adsorption chamber 52 is connected to communicate with the pressure chamber 64 via a bore 66. As shown, the bore 66 is extended axially through the member 60. Where so desired, the conduit 54 is axially mated with the bore 66. Such is achieved in any suitable manner, such as through a use of a suitable coupling 68 received within one end of the bore 66. Since the particular manner in which the conduit 54 is coupled with the bore 66 forms no part of the claimed invention, a detailed description thereof is omitted in the interest of brevity.

It is important to note, however, that within the adsorption chamber 52 there is disposed a quantity of an adsorbant material, herein referred to as an adsorber, designated 70. The adsorber may be fabricated from Zeolite, charcoal, or a metal hydride. Additionally, it is to be understood that the chambers 52 and 64 are charged with a quantity of compatable, thermally conductive gas which is suited for adsorption by the particular adsorbant employed. Helium gas, not shown, and a Zeolite adsorbant may be employed satisfactorily as a suitable gas/adsorber combination.

At this juncture, it is noted that within the chamber 52 there is provided a device 72 for cooling the adsorber. While the device 72 comprises a cooling coil, as depicted, the cooling coil may be omitted in those instances where a thermal leak is sufficient for transferring a suitable flow of thermal energy from the adsorber 70 to an ambient environment.

Additionally, a heating device, such as a resistance heater 74, as shown, comprises a device suitable for heating the adsorber 70. Here again, it is possible to eliminate the resistance heater 74 in those instances where thermal energy may be delivered through other means to the adsorber 70 in sufficient quantities.

In practice, one manner in which the system is caused to function quite satisfactorily in a terrestial environment is to connect a thermal conductor between the adsorption chamber 52 and a source of low temperature which is sufficient to conduct heat from the adsorption chamber at a rate adequate for causing the adsorber 70 to adsorb the gas once the heater 74 is switched off. However, for the sake of providing for a complete understanding of the instant invention, it is to be understood that where so desired, the control circuit 56 also includes conventional circuit components having a capability of switching the adsorption chamber 52 between a desorbing, or system pressurizing mode, and an adsorbing, or system evacuating mode, for purposes of varying the thermal conductivity of the chamber 64.

In view of the foregoing, it should now be apparent that once the adsorber 70 is cooled to a low temperature, the body of gas contained in the chambers 64 and 52 is adsorbed by the adsorber 70. Consequently, there thus is established a sparsity of gas molecules in the chamber 64 so that the thermal conductivity of the chamber 64 is greatly reduced. However, upon a heating of the adsorber 70, the gas previously adsorbed is desorbed for again pressurizing the chambers 52 and 64 whereby the molecular population therein is increased. Thus, the thermal conductivity of the chamber 64 is greatly enhanced.

Hence, it should now be apparent that by controlling the heating and the cooling of the adsorber 70, through the heating element 74 and the cooling coil 72, or by other means, the thermal conductivity of the chamber 64 is varied and thus the thermal switch is switched between open and closed modes.

OPERATION

It is believed that in view of the foregoing description of the invention, the operation of the system 10 will readily by understood, however, in the interest of assuring a complete understanding of the invention and its operation, it will briefly be reviewed at this point.

With the adsorption refrigeration system 10 interconnected between the thermal load 44 and a heat rejector 46, the system is prepared for operation. A cycle of operation is hereinafter more fully described.

Initially, it is understood that when the switches 48a and 48c are open, the switches 48b and 48d will be closed. Opening and closing of the heat switches 48a through 48d is achieved by varying the temperature for the adsorber 70 within the adsorption chamber 52 of the switch control devices 50a and 50b. Assuming that the heater 16 initially is energized through a suitable activation by the heater control circuit 20, and further assuming that upon energization of the heater 16 the adsorbant contained within the adsorption chamber 12, not shown, is heated for thus causing the previously adsorbed gas contained therein to be discharged from the adsorption chamber, via the conduit 22. As the gas passes from the adsorption chamber 12 it is caused to pass through the pre-cooler 26 at which a pre-cooling of the gas occurs. The pre-cooled gas now continues to flow through the conduit 29 to the heat exchanger 28 and thence to the expansion chamber 36, via the conduit 32. Of course, the gas gives up heat in the heat exchanger 28 and undergoes further cooling at the expansion chamber 36. However, the gas exits the expansion chamber 36, via the conduit 42a, and is further expanded at the Joule Thomson expander 40 for a final cooling. Thereafter, the finally cooled gas is delivered to the expansion chamber 38, via the conduit 42b. However, at this point, the switch control 50b is operatively maintaining the switch 48d interposed between the thermal load 44 and the chamber 38 in a switch-closed condition. Consequently, a thermal path for heat is established from the thermal load 44 to the expansion chamber 38 via the heat switch 48d. The gas flowing from the expander 40 to the expansion chamber 38 is permitted to pick up heat, derived from the thermal load 44, and continues to flow toward the absorption chamber 14, via the conduit 34, the heat exchanger 28, the conduit 30 and the pre-cooler 26.

As the gas thus heated in the expansion chamber 38 is caused to pass through the heat exchanger 28, additional heat is picked up from the gas passing therethrough from the pre-cooler 26.

As the thus heated gas continues to flow from the heat exchanger 28, toward the adsorption chamber 14, it courses through the conduit 30 and thence to the pre-cooler 26, the conduit 24 and then to the adsorption chamber 14.

At this juncture, it is important to note that the heat switch 48b is maintained in a switch-closed condition by the switch control 50a for thus permitting heat to be transmitted from the adsorption chamber 14 to the heat rejector 46, via the heat switch 48b and the thermal conductor 49b. Thermal energy thus is conducted from the adsorption chamber 14 to the heat rejector 46 via the heat switch 48b and the thermal conductor 49b.

Of course, the heater 18 remains in a switch-off condition while the adsorbant confined therein serves to adsorb the body of gas, in response to a cooling of the adsorbant, as the thermal energy is transferred to the heat rejector 46 and thence to the ambient environment.

Once the body of gas within the system 10 is adsorbed within the adsorption chamber 14, the second half of the cycle of operation is initiated simply by opening the heat switches 48b and 48d while closing the heat switches 48a and 48c, employing the switch controls 50a and 50b in a suitable manner.

Additionally, the heater 16 is de-energized while the heater 18 is energized for purposes of accommodating a cooling of the adsorbant within the adsorption chamber 12 and a heating of the adsorbant within the adsorption chamber 14. As the adsorbant within the adsorption chamber 14 is heated, desorption of the gas is initiated, causing the gas to flow in a direction reverse to that described with respect to the first half-cycle of operation for the system 10.

Consequently, it will be appreciated that gas now flows from the chamber 14 through the pre-cooler 26, the heat exchanger 28, the expansion chamber 38 and is finally cooled at the Joule Thomson expander 40, prior to its delivery to the expansion chamber 36. The expansion chamber 36 now is being heated in response to the thermal load 44 being applied thereto via the thermal conduits 49c and the closed switch 48c. The heated gas now exits the expansion chamber 36 and continues to flow to the adsorption chamber 12, via the conduits 32, 29, and 22, while passing through the heat exchanger 28 and the pre-cooler 26. The thermal energy of the gas is now delivered to the heat rejector 46, via the thermal conduits 49a and the gas heat switch 48a. In response to a delivery of the thermal energy from the gas, the adsorbant within the chamber 12 cools for thus permitting the gas to be adsorbed. Thus the cycle of operation of the system is complete.

As hereinbefore described, the "opening" and "closing" of the gas heat switches 48a through 48d are controlled simply by controlling the temperature of the adsorber 70, for selectively pressurizing and de-pressurizing the chamber 64. Control of the temperature of the adsorber 70 is selectively controlled by imposing control over control circuit 56 utilizing the controller 50a and 50b.

In view of the foregoing, it is believed to be readily apparent that the invention hereinbefore described provides a practical and economic solution to the problems of enhancing the longevity, increasing efficiency, and reducing the mass and bulk of refrigeration systems. It is contemplated that the invention as hereinbefore described ultimately will find utility in micro-electronic industries.

What is claimed is:

1. In an adsorption refrigeration system the improvement comprising:
A. first system means for alternately adsorbing and desorbing a system pressurizing gas including an adsorption chamber;
B. second system means for alternately adsorbing and desorbing said system pressurizing gas including an adsorption chamber;
C. circuit means interconnecting said first and second system means for sequentially directing a cyclically reversing flow of said system pressurizing gas between said first and said second system means including a Joule Thomson expander for cooling the gas, said circuit means further including a first and a second expansion chamber interconnected in communicating relation through said Joule Thomson expander, and means connecting said expansion chambers in mutually independent communicating relation with said adsorption chambers;
D. a first pair of heat switches connected to said first and second system means for alternately connecting a heat load to said first and second expansion chambers;
E. a second pair of heat switches connected to said first and second systems means for alternately connecting a heat rejector to said adsorption chambers; and
F. means for alternately closing the heat switches of each pair of heat switches.

2. An improvement as defined in claim 1 wherein each heat switch comprises:
A. a pair of thermal conductors disposed in mutually spaced relation for defining therebetween a pressure chamber, a further adsorption chamber including an adsorbant and a quantity of gas connected in communicating relation with said pressure chamber, and said means for alternately closing the heat switches including means for alternately initiating an adsorbing and desorbing of the gas included in said further adsorption chamber for thereby pressurizing and depressurizing said pressure chamber, whereby said heat switch alternately is rendered thermally conductive and thermally insulative.

3. In a symmetrical adsorption refrigeration system, the improvement comprising:
A. a first system means including a first adsorption chamber for alternately adsorbing and desorbing therein a system pressurizing gas;
B. a second system means including a second adsorption chamber for alternately adsorbing and desorbing therein said system pressurizing gas;
C. system control means for sequentially pressurizing said first and second system means for initiating desorption of the system gas in the first adsorption chamber while simultaneously initiating adsorption of the system pressurizing gas in the second adsorption chamber, and subsequently initiating desorption of the system pressurizing gas in the second adsorption chamber while simultaneously initiating adsorption of the system pressurizing gas in the first adsorption chamber;
D. circuit means including a Joule Thomson expander interconnected with said first and second system means for conducting a reversing flow of said system pressurizing gas between said first and said second adsorption chambers in response to a sequential pressurization of said first and second system means; and
E. said system control means includes a first pair of gas heat switches for alternately connecting a heat load to said first and second system means, and a second pair of gas heat switches for alternately connecting heat rejection means to said first and second system means.

4. The improvement of claim 3 where each gas heat switch comprises:
A. a pair of mutually spaced thermal conductors having a pressurizable chamber defined therebetween, and means for alternately delivering a pressurizing gas to said pressurizable chamber including a further adsorption chamber containing an adsorbant connected in communication therewith and a quantity of pressurizing gas, and means for selectively initiating adsorption and desorption of said pressurizing gas.

5. The improvement as defined in claim 4 further comprising:
A. a heat exchanger commonly connected to the adsorption chambers of said first and second system means; and
B. means defining a heat input to said first and second system means comprising a pair of expansion chambers commonly connected in communication with said heat exchanger and said Joule Thomson expander.

6. A symmetrical adsorption refrigeration system comprising:
A. first system means and second system means and a body of adsorbable gas for alternately and reversely pressurizing said first and second system means, each of said system means comprising a thermally responsive adsorption chamber containing an adsorber for alternately adsorbing and desorbing said body of gas, and temperature control means connected with said adsorption chambers for thermally initiating adsorption and desorption of said body of gas;
B. circuit means defining a flow path extended between said adsorption chambers for conveying a cyclically reversing flow of said body of gas to and away from each of said adsorption chambers including a pre-cooler connected in communication with each of said adsorption chambers for cooling said body of gas as it is caused to flow away from said adsorption chambers, a heat exchanger commonly connected to said adsorption chambers for further cooling said body of gas as it flows away from said adsorption chambers, and a pair of expansion chambers connected in communication with said adsorption chambers via said heat exchanger and said pre-cooler, and means including a Joule Thomson expander interconnecting said expansion chambers in mutual communication as it flows between said expansion chambers;
C. means including a first pair of normally open gas heat switches adapted alternately to close for cyclically connecting to each of said expansion chambers a heat load;
D. means including a second pair of normally open gas heat switches adapted alternately to close for cyclically connecting to each of said adsorption chambers, heat rejection means, each of said heat switches being characterized by a chamber pressurizable to define a thermal path therethrough; and
E. heat switch control means connected to each of said heat switches, for varying the thermal conductivity thereof, said heat switch control means being characterized by a further adsorption chamber having a further adsorber and a further body of gas contained therein, said control means being connected in communicating relation with a gas pressurization chamber of said first and second pair of heat switches and means for selectively varying the temperature of said further adsorption chambers.

* * * * *